3,152,879
HARVESTING METHOD
John W. Yale, Jr., Lindsay, Calif., assignor to Union Oil Company of California, Los Angeles, Calif., a corporation of California
No Drawing. Filed June 5, 1961, Ser. No. 114,662
8 Claims. (Cl. 71—2.2)

This invention relates to defoliation and desiccation of growing plants as an aid to harvesting the crop of said plants by providing a premature leaf abscission and/or necrosis.

This invention comprises the application of concentrated aqueous solutions of ammonium salts, particularly the sulfate, nitrate, chloride and mixtures thereof, to the growing plant in dosages of about 45 to about 250 pounds per acre.

In addition to securing the desired plant regulatory and phytotoxic effect, the ammonium salts are plant nutrients and serve to enrich the soil for subsequent crops.

I am aware that various ammonium salt solutions have been suggested for use as defoliants; e.g., U.S. Patent No 2,368,601 suggests use of ammonium cyanate, thiocyanate, fluoride, chlorate and sulfonate; U.S. 2,760,854 suggests use of ammonium chloroacetate; and 2,769,702 suggests use of ammonium fluosilicates as defoliants. Various patents have also suggested the use of ammonium salts of strong mineral acids as "intensifiers" for use with various phytotoxic agents. Thus ammonium sulfate, chloride, nitrate and phosphate have been suggested to have a synergistic phytotoxic effect at low concentrations with various chemical defoliants and herbicides.

I am not aware, however, of any suggestion that high dosages of concentrated solutions of ammonium nitrate, ammonium sulfate, ammonium chloride, or combinations thereof would have a combined abscissive and necrotic effect on mature plants.

The most common difficulty experienced with various chemical defoliants, such as those previously mentioned, has been the failure to obtain consistent results. Defoliants function by promoting the activity of plant tissues at the base of the leaf stalks, resulting in abscission of the leaves. Chemical defoliants are greatly influenced by the plant environment and are generally active in only a narrow concentration range. The necessary control of these influencing factors is often impossible under field conditions and, consequently, the results have been spotty and inconsistent.

Recent advancements in harvesting machinery, particularly improvements in cotton ginning, have achieved satisfactory crop harvesting when the plant leaves have been desiccated even though the plant has not been completely defoliated.

It is an object of this invention to provide a method which satisfactorily desiccates the leaves of growing plants to facilitate their harvest.

It is also an object of this invention to obtain a high degree of defoliation in combination with said desiccation.

I have found that the application of aqueous solutions of ammonium nitrate, ammonium chloride, ammonium sulfate, or mixtures thereof at solute concentrations in excess of 15 weight percent, preferably 20 weight percent, very thoroughly desiccates plant leaves.

I have also discovered that when the aforementioned ammonium salts are applied to crops such as cotton, alfalfa, sugar cane, etc., at dosages in excess of 45 pounds per acre and preferably between about 60 and 250 pounds per acre, abscission of the leaves also occurs so that many of the desiccated leaves fall from or are readily separated from the plant. This effect appears to be unique to the aforementioned ammonium salts; aqua ammonia, ammonium sulfite, ammonium polysulfide, ammonium carbonate and ammonium bicarbonate fail to exhibit similar defoliating activity.

Desiccation and necrosis of the plant leaves is accomplished in accordance with my invention by application to the leaves of the ammonium salt solution having a concentration of at least about 15 weight percent and preferably greater than about 20 weight percent. The greater the concentration of the ammonium salt, the greater is its desiccating effect and accordingly, the maximum concentration is limited in most instances by the solubility of the particular ammonium salt at the minimum expected handling temperature.

In general, ammonium nitrate solutions are commercially available as "20-0-0" fertilizers having about 57 weight percent solute and this concentration is very suitable for direct application in accordance with my invention. The ammonium chloride and sulfate solutions are prepared from the salts and generally any concentration above about 15 weight percent can be employed for desiccation.

The combination of ammonium chloride and nitrate, ammonium chloride and sulfate, ammonium sulfate and nitrate, or ammonium sulfate, nitrate and chloride can also be employed. Thus about 8 to 10 weight percent ammonium chloride or ammonium sulfate can be added to the aforementioned "20-0-0" ammonium nitrate to provide mixed ammonium salt solutions. Other solutions having about 0 to 25 percent ammonium chloride, about 0 to 40 percent ammonium sulfate, and about 65 to 0 percent ammonium nitrate can also be prepared from available solutions or salts.

To attain thorough desiccation of the plant leaves, the solutions are applied in a sufficient dosage to wet the leaf tissues by hand, machine or aerial spraying. The wetting or spreading of the solutions can be greatly facilitated by addition of various surface active agents in amounts between about 0.05 and 10 weight percent. The choice of any particular surface active agent is within the skill of the art from the various types of agents such as the following:

Anionic agents, e.g., alkali metal soaps such as sodium laurate, potassium naphthanate, etc.; sulfated fatty acids such as sodium heptadecyl sulfate, sulfated sperm oil, sodium oleyl sulfate, etc.; alkyl aryl sulfonates such as lauryl benzene sulfonate, decyl naphthalene sulfonate, etc.

Cationic agents, e.g., fatty amines such as oleyl dimethylamine oxide, linoleyl amine, etc.; quaternary ammonium bases such as trialkyl benzyl ammonium chloride, octadecyl dimethylethyl ammonium chloride, etc.

Nonionic agents such as various oxyethylene condensation products with fatty acids, amines, amides, alcohols, alkylated phenols, etc.

In addition to the aforedescribed desiccation, I have found that a high degree of defoliation is secured when the aforedescribed concentrated ammonium salt solutions are applied at dosages in excess of 45, preferably in excess of 60 pounds of salt per acre. In particular, solutions of ammonium nitrate alone or admixed with ammonium chloride and/or ammonium sulfate appear to have maximum defoliating properties. To some extent, desiccation of the plant leaves competes with defoliation, since the application of very concentrated solutions (above about 35 weight percent salt) desiccates the plant tissues before abscission can occur. With lower concentrations, however, (about 10 to 35%) the two effects occur simultaneously with good defoliation and moderate to severe desiccation resulting.

The dual action of ammonium salt solutions tends to reduce the number of failures commonly experienced with most chemical defoliants. As previously mentioned, the latter are active as defoliants, generally in a very narrow concentration range. The ammonium salt solutions, however, in a sense, have a dual concentration range. At dosages over about 45 pounds per acre, solutions of these salts cause defoliation and at concentrations above about 15 weight percent, the solutions cause desiccation. Quite often, the concentration of the solutions as actually applied to the plants is difficult to control, as, for instance, when the plant leaves are wet from dew or rain or when aerial spraying is employed. While these variables often cause chemical defoliants to fail, they merely change the nature of the effect of the ammonium salt solutions from that of predominantly desiccation to defoliation or vice versa.

The following examples will serve to illustrate my invention:

EXAMPLE I

Aqueous solutions of admixed ammonium nitrate and ammonium chloride were applied to rows of cotton plants with a hand sprayer. The volume of the solution applied was 120 gallons per acre. For comparison, a chemical defoliant, a 17.5 percent solution of magnesium chlorate, was applied to an adjacent row of cotton plants. The following table summarizes the test conditions and results on the plant leaf tissues:

*Table 1*

| Test Solution | Chemical | Concentration, Wt. percent | Dosage, lbs./acre | Results | |
|---|---|---|---|---|---|
| | | | | Defoliation | Desiccation |
| 1 | NH$_4$Cl / NH$_4$NO$_3$ | 4.6 / 3.1 | 50 / 33 | Slight to Good. | None. |
| 2 | NH$_4$Cl / NH$_4$NO$_3$ | 8.6 / 5.7 | 100 / 66 | Good | Do. |
| 3 | MgClO$_3$ | 17.5 | a 3 | Slight | Do. | a Recommended dosage for defoliation by supplier.

This example shows that ammonium salt solutions having less than about 15 weight percent solute are effective defoliants; in this test exhibiting better defoliation than the prior art suggested magnesium chlorate. At these lower concentrations, however, the solutions were not effective as desiccants.

EXAMPLE II

To demonstrate the desiccation effect of concentrated solutions, aqueous solutions of admixed ammonium chloride and ammonium nitrate were applied to cotton plants at a volume dosage of 60 gallons per acre. The results are summarized in the following table:

*Table 2*

| Test Solution | Chemical | Concentration, Wt. percent | Dosage, lbs./acre | Results | |
|---|---|---|---|---|---|
| | | | | Defoliation | Desiccation |
| 4 | NH$_4$Cl / NH$_4$NO$_3$ | 9.7 / 9.7 | 60 / 60 | Slight / do | Severe. / Do. |
| 5 | NH$_4$Cl / NH$_4$NO$_3$ | 5.1 / 10.2 | 30 / 60 | do / do | Do. / Do. |

This example shows that ammonium salt solutions having more than about 15 weight percent solute are effective leaf desiccants.

EXAMPLE III

Aqueous solutions of ammonium nitrate and ammonium sulfate were applied to cotton plants by hand spraying at a volume dosage of 84 gallons per acre. The following table summarizes the results:

*Table 3*

| Test Solution | Chemical | Concentration, Wt. percent | Dosage, lbs./acre | Results | |
|---|---|---|---|---|---|
| | | | | Defoliation | Desiccation |
| 6 | NH$_4$NO$_3$ / (NH$_4$)$_2$SO$_4$ | 2.0 / 6.0 | 16.5 / 50 | Slight to Good. | None. |
| 7 | NH$_4$NO$_3$ / (NH$_4$)$_2$SO$_4$ | 4.0 / 12.0 | 33 / 100 | Excellent | Slight. |

This example illustrates the defoliating and desiccating effects of admixed sulfate and nitrate ammonium salt solutions.

EXAMPLE IV

An aqueous solution having equal parts of ammonium chloride and nitrate and having a total solute content of about 15 weight percent was applied to a row of cotton plants by hand spraying. The volume of spray was 60 gallons per acre. Good defoliation and moderate desiccation of the plant leaves was obtained. The dosage was 45 pounds per acre of ammonium chloride and 45 pounds per acre of ammonium nitrate. When only ammonium nitrate was applied in a 10.7 weight percent concentration and a dosage of 60 pounds per acre, good defoliation and only slight desiccation was obtained.

EXAMPLE V

An aqueous solution of 49 weight percent ammonium nitrate containing about 1 percent of sodium alkyl aryl sulfonate wetting agent ("Fab") was sprayed on mature cotton plants at a volume dosage of 10 gallons per acre. The salt dosage was 50 pounds per acre. Between 50 and 75 percent of the leaves were defoliated and all the leaves remaining on the plants were completely desiccated.

The preceding examples are intended to illustrate, not to unduly limit, my invention which is set forth in the following claims.

I claim:

1. The method of facilitating the harvest of mature plants which comprises applying an aqueous ammonium salt solution to said plants at a dosage greater than about 45 pounds of said salt per acre, said salt solution having a solute content greater than about 35 weight percent and selected from the group consisting of aqueous solutions of ammonium nitrate, ammonium chloride, ammonium sulfate and mixtures thereof.

2. The method of claim 1 wherein said solution contains a surface active agent.

3. The method of claim 1 wherein said solution contains between about 35 and 65 weight percent ammonium nitrate.

4. The method of claim 1 wherein said solution contains ammonium chloride.

5. The method of claim 1 wherein said solution contains ammonium sulfate.

6. The method of desiccating leaf tissues of mature cotton plants which comprises spraying onto said plants an aqueous ammonium salt solution having a concentration between about 35 and 65 weight percent of an ammonium salt selected from the class consisting of ammonium nitrate, ammonium chloride, ammonium sulfate and mixtures thereof.

7. The method of claim 6 wherein said solution also contains between about 0.05 and 10 weight percent of a surface active agent.

8. The method of defoliating mature cotton plants which comprises spraying an aqueous salt solution consisting essentially of ammonium chloride onto said plants at a dosage between about 45 and 250 pounds of said salt per acre, said salt solution having an ammonium chloride solute content between about 10 and 35 weight percent.

References Cited in the file of this patent

UNITED STATES PATENTS

| | | |
|---|---|---|
| 2,277,744 | Cupery et al. | Mar. 31, 1942 |
| 2,726,149 | Boyd | Dec. 6, 1955 |
| 2,760,854 | La Lande | Aug. 28, 1956 |
| 3,023,095 | Nolan | Feb. 27, 1962 |

OTHER REFERENCES

Gausman et al.: "Chemical Abstracts," vol. 48, 1954, col. 9600(b).